(12) United States Patent
Delia et al.

(10) Patent No.: US 7,660,872 B2
(45) Date of Patent: Feb. 9, 2010

(54) MANAGING LOCATION INFORMATION FOR A GROUP OF USERS

(75) Inventors: Wayne M. Delia, Poughkeepsie, NY (US); Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 10/908,565

(22) Filed: May 17, 2005

(65) Prior Publication Data

US 2006/0265484 A1    Nov. 23, 2006

(51) Int. Cl.
G06F 15/16 (2006.01)
H04M 11/04 (2006.01)
H04W 24/00 (2009.01)

(52) U.S. Cl. ............... 709/217; 709/218; 455/404.2; 455/456.1; 455/457

(58) Field of Classification Search ........... 709/225, 709/229, 217, 218; 455/420, 445, 458, 456.6, 455/404.2, 456.66, 456.1
See application file for complete search history.

(56) References Cited

U.S. PATENT DOCUMENTS

| | | | | |
|---|---|---|---|---|
| 5,611,406 A * | 3/1997 | Matsuzaki et al. | ........... | 180/167 |
| 5,633,913 A * | 5/1997 | Talarmo | ............. | 455/446 |
| 5,778,304 A * | 7/1998 | Grube et al. | ............. | 455/456.4 |
| 6,362,778 B2 * | 3/2002 | Neher | ............. | 342/357.07 |
| 6,400,690 B1 * | 6/2002 | Liu et al. | ............. | 370/252 |
| 6,442,551 B1 * | 8/2002 | Ofek | ............. | 707/10 |
| 6,504,503 B1 * | 1/2003 | Saint-Hilaire et al. | .. | 342/357.09 |
| 6,608,556 B2 * | 8/2003 | De Moerloose et al. | ..... | 340/501 |
| 6,674,368 B2 * | 1/2004 | Hawkins et al. | ............. | 340/573.4 |
| 7,124,370 B2 * | 10/2006 | Fish | ............. | 715/741 |
| 7,181,228 B2 * | 2/2007 | Boesch | ............. | 455/456.1 |
| 7,219,303 B2 * | 5/2007 | Fish | ............. | 715/753 |
| 7,237,201 B2 * | 6/2007 | Fish | ............. | 715/753 |
| 7,256,732 B2 * | 8/2007 | De Salas et al. | ........ | 342/357.07 |
| 7,474,896 B2 * | 1/2009 | Mohi et al. | ............. | 455/456.1 |
| 2001/0026240 A1 * | 10/2001 | Neher | ............. | 342/357.07 |
| 2001/0032236 A1 * | 10/2001 | Lin | ............. | 709/203 |
| 2002/0169539 A1 * | 11/2002 | Menard et al. | ............. | 701/200 |
| 2003/0050038 A1 * | 3/2003 | Haave et al. | ............. | 455/404 |
| 2003/0134648 A1 * | 7/2003 | Reed et al. | ............. | 455/456 |
| 2003/0217151 A1 * | 11/2003 | Roese et al. | ............. | 709/225 |

(Continued)

*Primary Examiner*—Ario Etienne
*Assistant Examiner*—Tae K Kim
(74) *Attorney, Agent, or Firm*—Ronald Kaschak; Hoffman Warnick LLC

(57) ABSTRACT

A user designated as a group leader of a group of users manages location information for the group of users using a base device. In particular, a client device is identified for each user in the group of users and an area within which each user in the group of users is to remain is defined. Subsequently, the base device can obtain location information for the client device(s) and process the location information for use by the group leader. For example, the base device can display the current location of one or more users, display the relative location of one or more users with respect to the group leader, and/or determine if one or more users are outside of the area. The group leader can then coordinate the group by communicating with one or more users in the group. In this manner, the group leader can make more informed decisions about the status of each group member and more efficiently coordinate the re-grouping and/or movement of the group of users.

17 Claims, 5 Drawing Sheets

U.S. PATENT DOCUMENTS

| | | | |
|---|---|---|---|
| 2004/0198398 A1* | 10/2004 | Amir et al. | 455/456.6 |
| 2004/0202120 A1* | 10/2004 | Hanson | 370/328 |
| 2004/0260762 A1* | 12/2004 | Fish | 709/201 |
| 2004/0266453 A1* | 12/2004 | Maanoja et al. | 455/456.1 |
| 2005/0030194 A1* | 2/2005 | Cheng et al. | 340/825.49 |
| 2005/0054351 A1* | 3/2005 | McAlexander | 455/456.1 |
| 2005/0197190 A1* | 9/2005 | Amaitis et al. | 463/42 |
| 2005/0203801 A1* | 9/2005 | Morgenstern et al. | 705/14 |
| 2006/0223518 A1* | 10/2006 | Haney | 455/420 |
| 2007/0288852 A1* | 12/2007 | Fish | 715/753 |

* cited by examiner

MANAGING LOCATION INFORMATION FOR A GROUP OF USERS

BACKGROUND OF THE INVENTION

1. Technical Field

The invention relates generally to monitoring the locations of a group of users, and more particularly, to an improved solution for managing location information for the group of users.

2. Related Art

Frequently, when a group of individuals visit a relatively large location, such as an amusement park, a business convention, a shopping mall, or the like, the group will split up and move about the location according to each individual's particular interests. As a result, the group will often set a predetermined time and/or location at which to meet. However, often, one or more members of the group may not arrive at the location and the group must spend time and effort in locating these individuals.

To locate an individual, a mobile telephone can be used to talk to the individual and determine his/her location. However, in order to change a rendezvous time and/or location for the entire group, a telephone call will be required for each individual in the group. When use of a mobile telephone is not available/desired, a radio frequency identification (RFID) device can be used to locate an individual. For example, a family can rent an RFID device from an amusement park and pin it to a child. When the child is lost, detection of the RFID device at one or more RFID hot spots located in the amusement park can be enabled. Once the RFID device is detected, the parent(s) can be notified, and the area searched for the child.

These solutions have several limitations. For example, there is no ability for one member of the group (e.g., a group leader) to easily monitor the location of the other members of the group and/or members of the group to determine the location of the group leader. Further, when two-way communication is possible, it is limited to two group members and each individual will need to describe his/her location, which may be difficult in an unfamiliar environment. As a result, these solutions fail to provide a comprehensive solution for determining when a member of the group moves beyond an allowed area and/or for changing a rendezvous location. As the size of a group increases (e.g., a tour group), the effort required to locate one or more missing group members and/or change a pre-determined arrangement increases substantially. As a result, the group leader may not make any effort to locate missing member(s) and/or change the arrangement.

In light of the above, a need exists for an improved solution for managing location information for a group of users.

SUMMARY OF THE INVENTION

The invention provides a solution for managing location information for a group of users, in which a user designated as a group leader of the group manages the location information using a base device. In particular, a client device is identified for each user in the group of users and an area within which each user in the group of users is to remain is defined. Subsequently, the base device can obtain location information for the client device(s) and process the location information for use by the group leader. For example, the base device can display the current location of one or more users, display the relative location of one or more users with respect to the group leader, and/or determine if one or more users are outside of the area. Additionally, the group leader can coordinate the group by communicating with one or more users in the group. In this manner, the group leader can make more informed decisions about the status of each group member and more efficiently coordinate the re-grouping and/or movement of the group of users.

A first aspect of the invention provides a method of managing location information for a group of users, the method comprising: obtaining a base device, wherein the base device is used by one of the group of users designated as a group leader; identifying a set of client devices, wherein each client device is used by one of the group of users; defining an area for the group of users, wherein each user in the group of users is to remain within the area; obtaining location information for each client device in the set of client devices; and processing the location information on the base device for use by the group leader.

A second aspect of the invention provides a method of managing location information for a group of users on a base device used by one of the group of users designated as a group leader, the method comprising: identifying a set of client devices, wherein each client device is used by one of the group of users; defining an area for the group of users, wherein the area comprises a maximum radius from the group leader and wherein each user in the group of users is to remain within the area; defining an update period; and periodically obtaining location information for each client device in the set of client devices based on the update period.

A third aspect of the invention provides a system for managing location information for a group of users, the system comprising: a base device used by one of the group of users designated as a group leader, the base device including: means for identifying a set of client devices, wherein each client device is used by one of the group of users; means for defining an area for the group of users, wherein each user in the group of users is to remain within the area; means for obtaining location information for each client device in the set of client devices; and means for processing the location information.

A fourth aspect of the invention provides a computer-readable medium that includes computer program code that enable a computer infrastructure to perform a method of managing location information for a group of users, the method comprising: identifying a set of client devices, wherein each client device is used by one of the group of users; defining an area for the group of users, wherein each user in the group of users is to remain within the area; obtaining location information for each client device in the set of client devices; and processing the location information.

A fifth aspect of the invention provides a computer-readable medium that includes computer program code to enable a computer infrastructure to manage location information for a group of users.

A sixth aspect of the invention provides a business method for managing location information for a group of users.

A seventh aspect of the invention provides a method of generating a system for managing location information for a group of users.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a solution for managing location information for a group of users, in which a user designated as a group leader of the group manages the location information using a base device. In particular, a client device is identified for each user in the group of users and an area within which each user in the group of users is to remain is defined. Subsequently, the base device can obtain location information for the client device(s) and process the location information for use by the group leader. For example, the base device can display the current location of one or more users, display the relative location of one or more users with respect to the group leader, and/or determine if one or more users are outside of the area. Additionally, the group leader can coordinate the group by communicating with one or more users in the group. In this manner, the group leader can make more informed decisions about the status of each group member and more efficiently coordinate the re-grouping and/or movement of the group of users.

Figure 1:
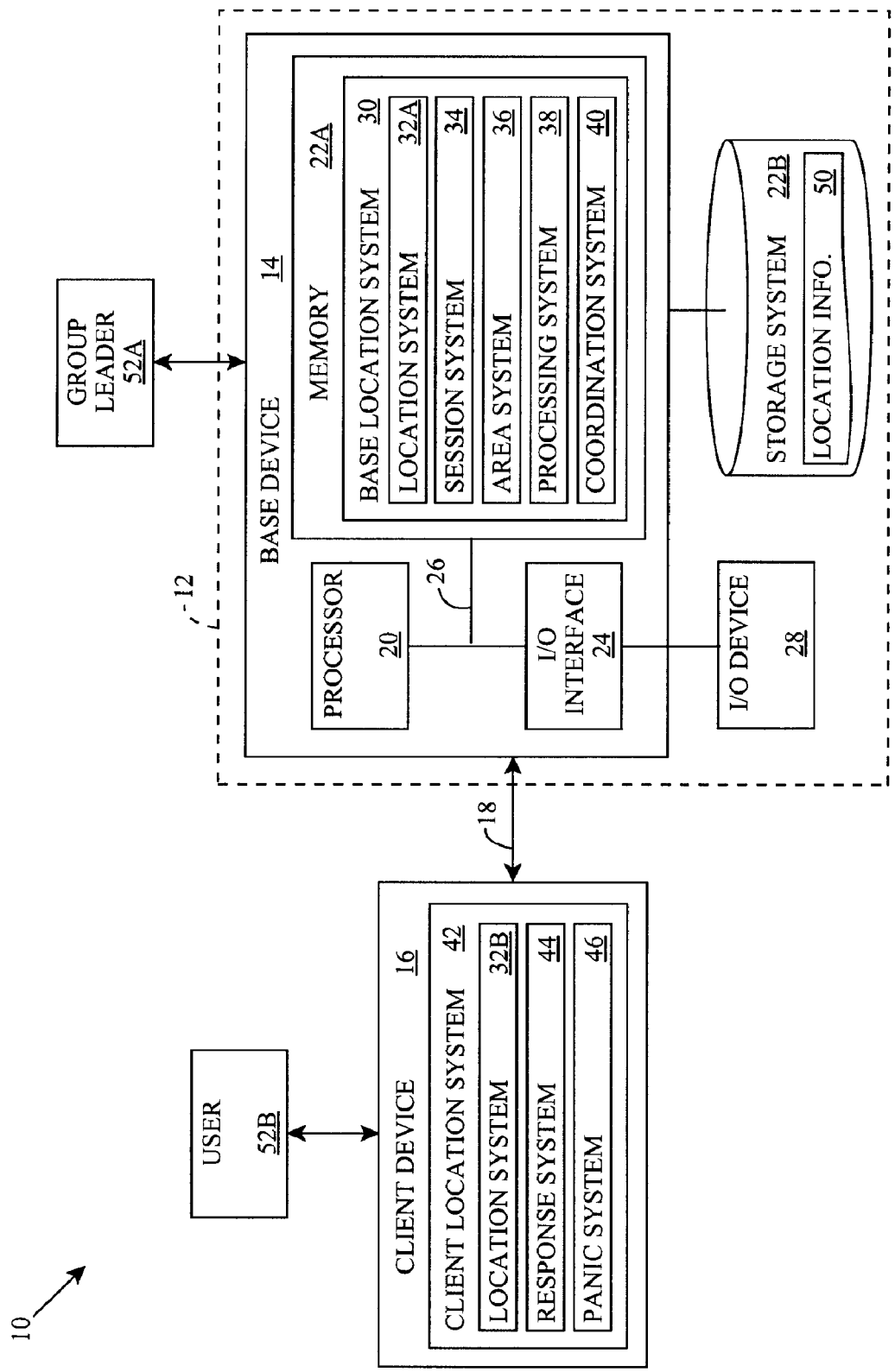
FIG. 1 shows an illustrative system for managing location information for a group of users.

Turning to the drawings, FIG. 1 shows an illustrative system 10 for managing location information (info.) 50 for a group of users 52A-B. To this extent, system 10 includes a computer infrastructure 12 that can perform the various process steps described herein for managing location information 50. In particular, computer infrastructure 12 is shown including a base device 14 that comprises a base location system 30, which enables base device 14 to manage location information 50 by performing the process steps of the invention.

Base device 14 is shown including a processor 20, a memory 22A, an input/output (I/O) interface 24, and a bus 26. Further, base device 14 is shown in communication with an external I/O device/resource 28 and a storage system 22B. As is known in the art, in general, processor 20 executes computer program code, such as base location system 30, that is stored in memory 22A and/or storage system 22B. While executing computer program code, processor 20 can read and/or write data, such as location information 50, to/from memory 22A, storage system 22B, and/or I/O interface 24. Bus 26 provides a communication link between each of the components in base device 14. I/O device 28 can comprise any device that enables group leader 52A to interact with base device 14 or any device that enables base device 14 to communicate with one or more other computing devices, such as client device 16.

In any event, base device 14 can comprise any general purpose computing article of manufacture capable of executing computer program code installed by a user, such as group leader 52A (e.g., a personal computer, server, handheld device, etc.). However, it is understood that base device 14 and base location system 30 are only representative of various possible equivalent computing devices that may perform the various process steps of the invention. To this extent, in other embodiments, base device 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

To this extent, computer infrastructure 12 can further comprise a client device 16. Client device 16 is shown in communication with base device 14 over a communications link 18. As discussed above, communications link 18 can comprise any combination of various types of communications links as is known in the art. In one embodiment, client device 16 comprises a computing device that is in communication with base device 14 over a wireless local area network (LAN), a cellular network, or the like. Regardless, it is understood that client device 16 can comprise the same components (processor, memory, I/O interface, etc.) as shown for base device 14. These components have not been separately shown and discussed for brevity.

As previously mentioned and discussed further below, base location system 30 enables computing infrastructure 12 to manage location information 50 for a group of users 52A-B. To this extent, base location system 30 is shown including a location system 32A for obtaining location information 50 for base device 14, a session system 34 for initializing a tracking session, an area system 36 for defining an area for the group, a processing system 38 for processing location information 38, and a coordination system 40 for enabling group leader 52A to coordinate the group. Operation of each of these systems is discussed further below. However, it is understood that some of the various systems shown in FIG. 1 can be implemented independently, combined, and/or stored in memory for one or more separate computing devices that communicate over a network. Further, it is understood that some of the systems and/or functionality may not be implemented, or additional systems and/or functionality may be included as part of system 10.

Regardless, the invention provides a solution for managing location information 50 for a group (two or more) of users 52A-B. In particular, one user 52A of the group of users is designated as a group leader 52A. Group leader 52A can comprise any entity, for example, an individual that is designated to be responsible for all users 52A-B in the group. For example, group leader 52A can comprise a parent, a chaperone, a high-ranking officer, or the like. In any event, group leader 52A manages location information 50 for the group of users 52A-B on base device 14. As discussed above, base device 14 can comprise any type of computing device. In one embodiment, base device 14 can comprise an off-the-shelf handheld computing device, such as a personal digital assistant (PDA), mobile telephone, or the like. Base device 14 can be obtained by group leader 52A by, for example, installing base location system 30 onto the handheld computing device.

Group leader 52A can use base device 14 to communicate with and/or obtain location information 50 for each user 52B in the group. To this extent, each user 52B uses a client device 16 that is in communication with base device 14. Similar to base device 14, each client device 16 can comprise an off-the-shelf handheld computing device such as a mobile telephone, or other wireless communications device. Each client device 16 includes a client location system 42 that provides the necessary functionality for obtaining location information 50 about user 52B and communicating with base device 14.

Figure 2:
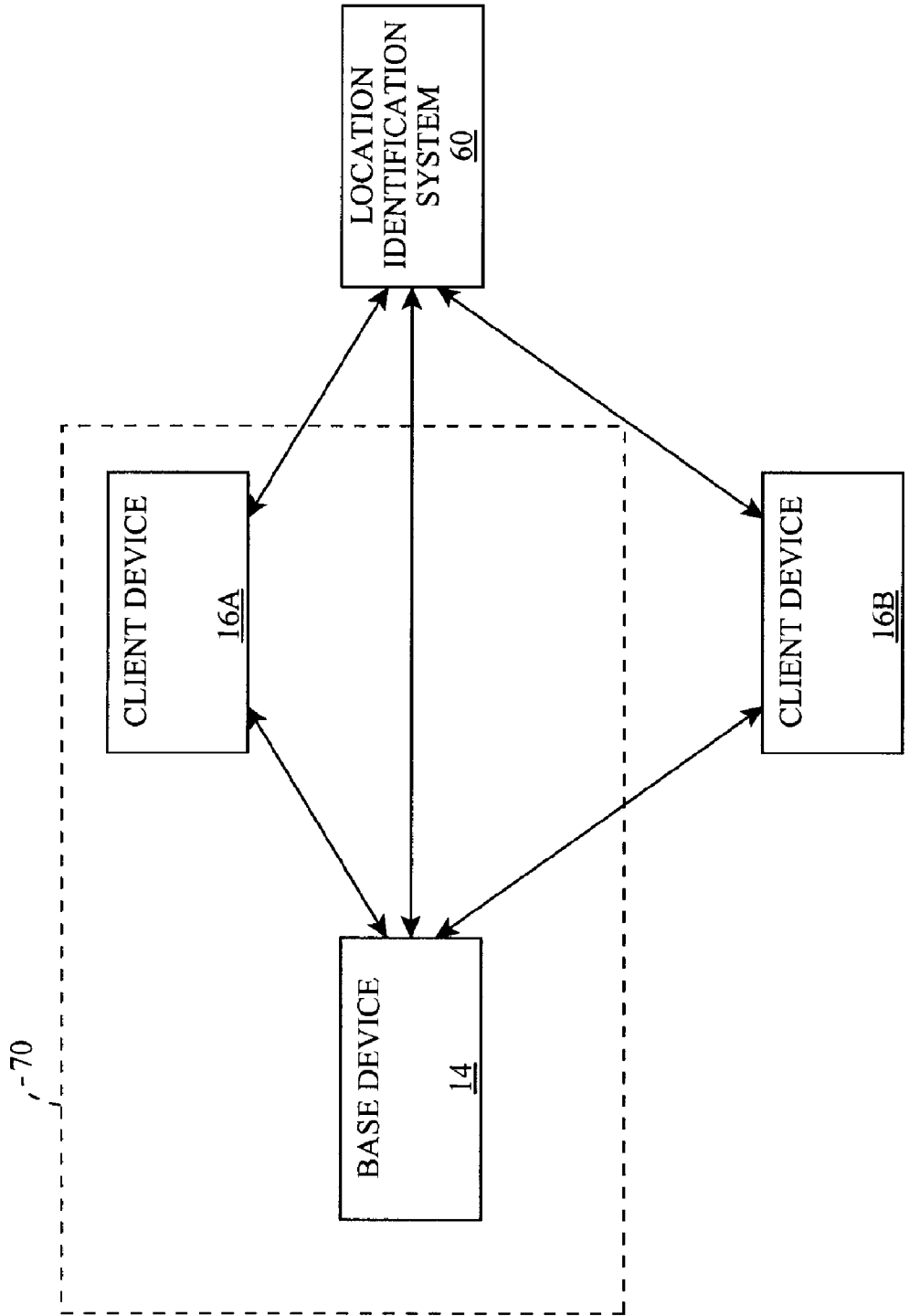
FIG. 2 shows an illustrative system for obtaining location information.

Base location system 30 and client location system 42 are both shown including location systems 32A-B, respectively. Location systems 32A-B obtain location information 50 for the corresponding device 14, 16. For example, FIG. 2 shows an illustrative system for obtaining location information 50 (FIG. 1). As shown in FIG. 2, base device 14 and each client device 16A-B can obtain location information 50 (FIG. 1) from a location identification system 60. In one embodiment, location identification system 60 comprises a global positioning system (GPS) and location systems 32A-B (FIG. 1) comprise systems that can obtain information from the GPS. In this case, each location system 32A-B can send a request for location information 50 for the corresponding device 14, 16A-B to location identification system 60. Location identification system 60 can determine the location information 50 (e.g., longitude, latitude, etc.) and provide it in a response that is received by the location system 32A-B for the corresponding device 14, 16A-B. Regardless, it is understood that location systems 32A-B could be implemented apart from base location system 30 (FIG. 1) and/or client location system 42 (FIG. 1). For example, location systems 32A-B could comprise standard functionality for base device 14 and/or client devices 16A-B. Further, it is understood that GPS is merely illustrative of various systems that could be used to obtain location information for base device 14 and/or client devices 16A-B.

Figure 3:
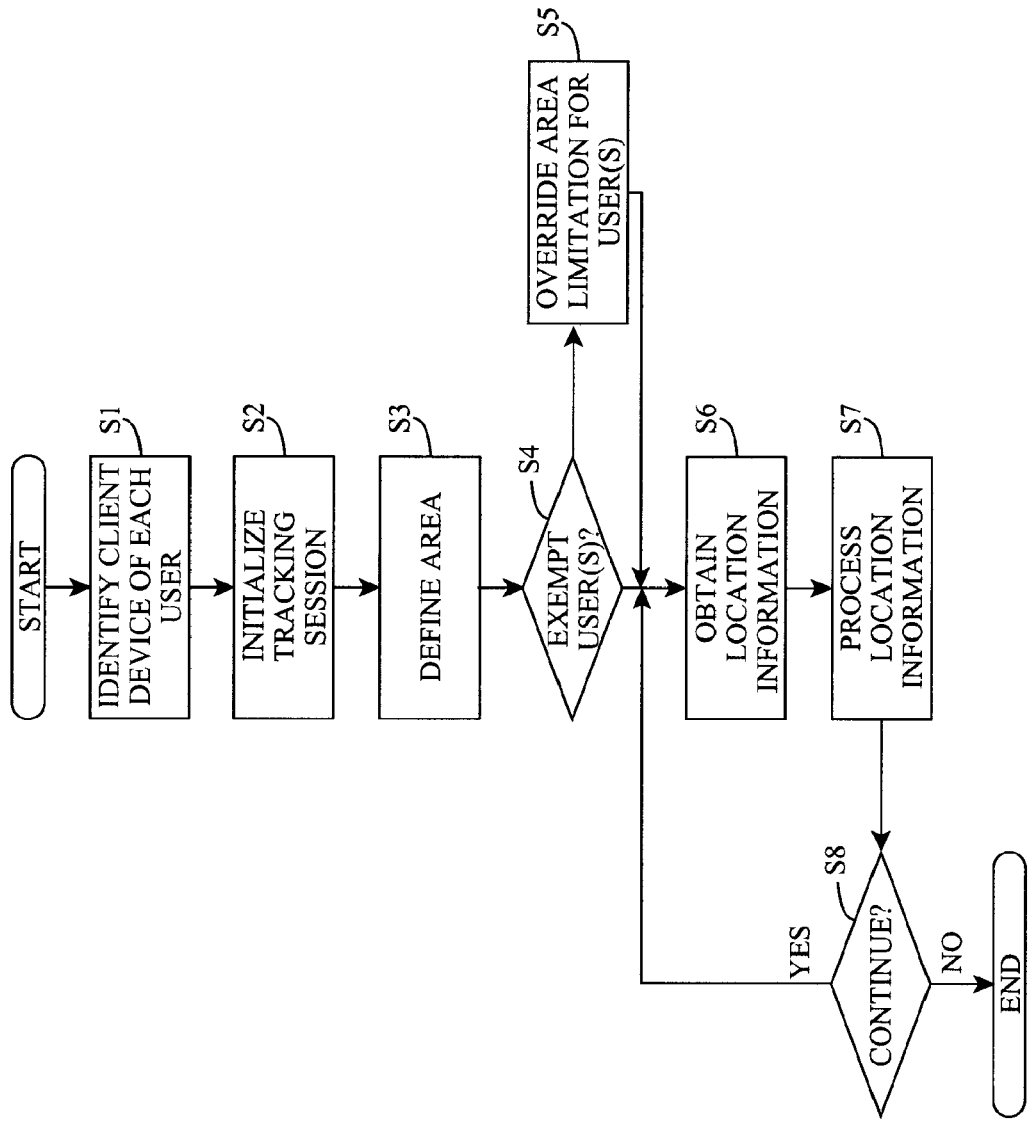
FIG. 3 shows illustrative method steps for managing location information.

In any event, FIG. 3 shows illustrative method steps for managing location information 50 (FIG. 1), which can be implemented by the various systems of FIG. 1. Referring to FIGS. 1 and 3, in order to manage location information 50 for users 52A-B, in step S1 of FIG. 3, base device 14 can identify each client device 16. To this extent, base device 14 is shown including a session system 34, which can identify a set (one or more) of client devices 16 for which location information 50 will be managed. In one embodiment, group leader 52A can provide contact information for each client device 16 to session system 34. Alternatively, session system 34 can send a generic query for client devices 16 to identify themselves. In response, each client device 16 can respond to the query with contact information for the corresponding client device 16. It is understood that any solution for limiting the possible client devices 16 can be used. For example, base location system 30 can send encrypted messages that only client location systems 42 having a corresponding private key or the like can read. Once identified, group leader 52A can further provide a user-friendly identification for each client device 16. For example, group leader 52A can enter a name of the user 52B that is using the corresponding client device 16. Subsequently, various interfaces provided to group leader 52A can use the user-friendly identification to identify each device 16.

In step S2 of FIG. 3, session system 34 can further initialize a tracking session for the set of client devices 16 and base device 14. In one embodiment, session system 34 generates a unique session identifier for the tracking session that is used in all messages sent between base device 14 and client device(s) 16. For example, session system 34 could generate the session identifier by concatenating a serial number of base device 14 with a time stamp for the start of the initialization. Further, session system 34 can use a unique identifier for each client device 16. For example, session system 34 could assign a unique sequence number to each client device 16. To this extent, session system 34 can communicate the session identifier and unique sequence number to each client device 16 as part of the initialization of the tracking session. Subsequently, when base device 14 desires to communicate with all client devices 16, the session identifier is included in the message, and when base device 14 desires to communicate with a particular client device 16, the session identifier and corresponding sequence number are included in the message.

In step S3 of FIG. 3, group leader 52A can further define an area within which each user 52A-B in the group of users 52A-B is to remain. To this extent, base location system 30 is shown including an area system 36 for defining the area. For example, when users 52A-B are visiting a particular geographical location (e.g., an amusement park, mall, or the like), the area can be defined by the geographical location. In this case, group leader 52A can use area system 36 to obtain the area from an external database or the like that includes location information for the geographical location. Alternatively, the area can be defined as a maximum radius from a starting location of the group and/or a maximum radius from the location of group leader 52A. In the latter case, the defined area will change as group leader 52A changes his/her location.

As discussed further below, when a user 52B leaves the defined area, base location system 30 can generate an alarm or the like for group leader 52A. However, one or more users 52B could be entitled to leave the defined area without generating an alarm. For example, it may be known that a user 52B will leave the area for a certain time period, a user 52B may be purposefully located outside of the defined area, or the like. To this extent, in step S4 of FIG. 3, group leader 52A can determine if one or more users 52A-B is allowed to leave the defined area. If so, then in step S5, group leader 52A can use area system 36 to override the defined area for the one or more users 52A-B. In particular, group leader 52A could use an interface generated by area system 36 to select the corresponding user(s) 52B that is/are allowed to leave the defined area. For example, returning to FIG. 2, group leader 52A (FIG. 1) may define an area 70 within which client devices 16A-B (and their corresponding users) are to remain. As shown, client device 16B is outside of the defined area 70. In this case, if the defined area 70 has not been overridden for the corresponding user, base device 14 can generate an alarm. Alternatively, if the defined area 70 has been overridden for the corresponding user, then no alarm would be generated.

Figure 4:
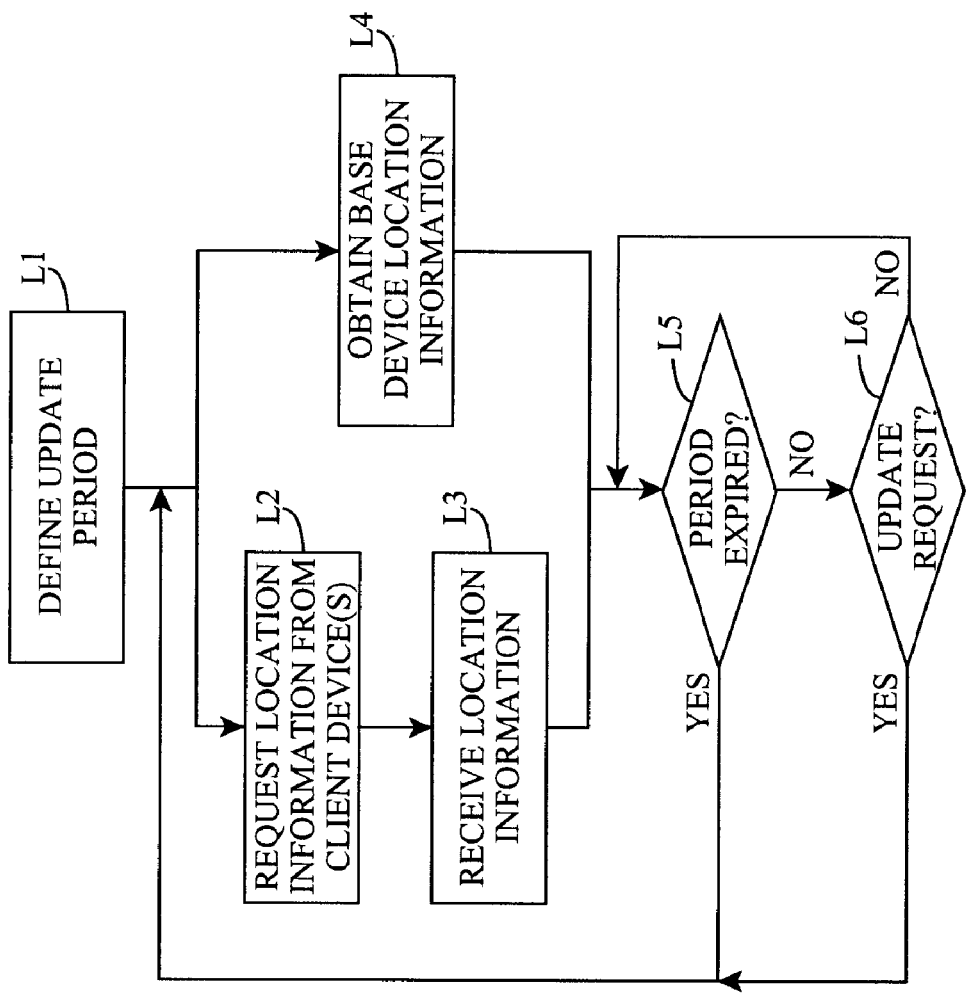
FIG. 4 shows illustrative method steps for obtaining location information.

Returning to FIGS. 1 and 3, in step S6 of FIG. 3, location system 32A can obtain location information 50. In particular, location system 32A can obtain location information 50 for each client device 16 and/or base device 14. To this extent, FIG. 4 shows illustrative method steps for obtaining location information, which can be implemented by location system 32A (FIG. 1). Referring to FIGS. 1 and 4, in step L1, location system 32A can define an update period for location information 50. In one embodiment, location system 32A can enable group leader 52A to select a desired update period.

Alternatively, location system 32A can use a default update period (e.g., one minute) that may or may not be altered by group leader 52A.

In any event, location information 50 can be periodically updated based on the update period. For example, in step L2, location system 32A can request location information 50 from one or more client device(s) 16. Subsequently, in step L3, location system 32A can receive location information 50 from the client device(s) 16 in response to the request. Additionally, as discussed further below, location information 50 for base device 14 may also be desired. To this extent, in step L4, location system 32A can obtain location information 50 for base device 14. For example, as discussed above, base device 14 can request and receive location information 50 from a location identification system 60 (FIG. 2). Further, similar to location information 50 for client device(s) 16, the location information 50 for base device 14 can be periodically obtained based on the update period.

In step L5, location system 32A can determine if the update period has expired. If so, then flow can return to step L2 and/or step L4, in which location information 50 is updated. If not, flow can proceed to step L6, in which location system 32A determines if an update of location information 50 has been requested. For example, group leader 52A could use an interface generated by location system 32A to request an update of the location information 50 for base device 14 and/or one or more client device(s) 16. If a request has been received, then flow can return to step L2 and/or step L4 and the requested location information 50 can be obtained. Alternatively, location system 32A can return to step L5 until the update period has expired.

Returning to FIGS. 1 and 3, after location information 50 is obtained in step S6, processing system 38 processes the location information 50 in step S7 as discussed further below. In step S8, base location system 30 determines if the tracking session is to continue, and if so, flow can return to step S6, in which location system 32A obtains new location information 50 that is subsequently processed by processing system 38 in step S7.

Figure 5:
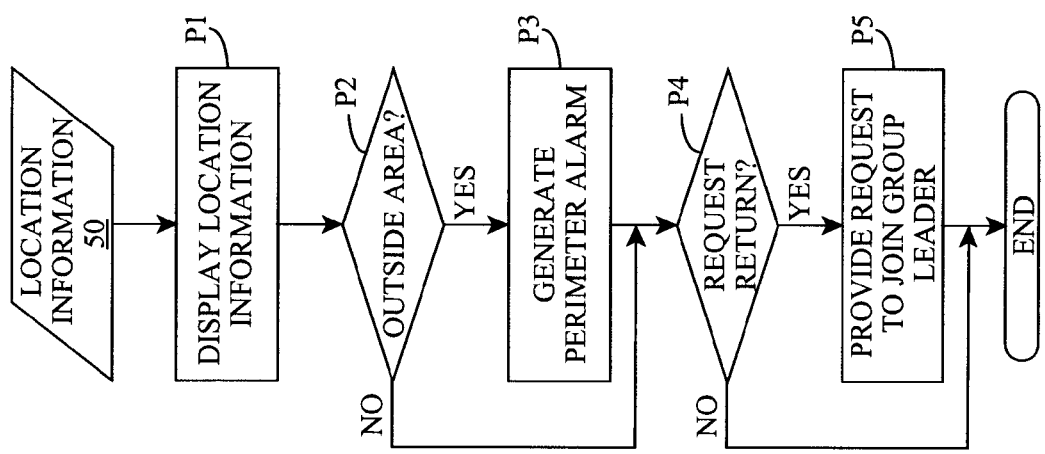
FIG. 5 shows illustrative steps for processing location information.

Processing system 38 can process location information 50 for use by group leader 52A on base device 14. To this extent, processing system 38 can perform various operations based on location information 50. For example, FIG. 5 shows illustrative steps for processing location information 50 that can be implemented by processing system 38 (FIG. 1). Referring to FIGS. 1 and 5, in step P1 of FIG. 5, processing system 38 can display location information on a display device for base device 14. In one embodiment, processing system 38 can display the location information 50 for all client devices 16 in a graphical manner. To this extent, location information 50 for base device 14 can be used to generate the display. For example, a location of base device 14 could be used as a center of the graphical area displayed. Similarly, processing system 38 can display location information 50 for a selected client device 16. To this extent, group leader 52A could use an interface or the like generated by processing system 38 to designate a desired client device 16 for which location information 50 is desired. In response, processing system 38 could display a direction and/or distance from base device 14 for the designated client device 16.

In any event, in step P2, processing system 38 can determine if one or more client devices 16 are outside of the defined area 70 (FIG. 2). As discussed above, area 70 could be a predetermined area (e.g., area of an amusement park) or a variable area that is based on the location of base device 14 (e.g., maximum radius from the current location of base device 14). Further, processing system 38 can determine if any client device 16 that is outside the defined area 70 is to remain within the defined area 70. If so, then in step P3, processing system 38 can generate a perimeter alarm. The perimeter alarm can comprise any type of sensory alarm (e.g., visual, audible, vibrating, or the like) that can be used to alert group leader 52A. Further, processing system 38 can display the last known location for the client device 16 that has left the defined area 70. This data can be used by group leader 52A to determine any action that may be required. Still further, processing system 38 could send an alarm message to the client device 16, which could also generate an alarm for the corresponding user 52B.

In addition to merely processing location information 50, base location system 30 can include a coordination system 40 that enables group leader 52A to coordinate the actions of each user 52A-B within the group. For example, in response to the perimeter alarm discussed above, in step P4 coordination system 40 can enable group leader 52A to request that the corresponding user 52B return to a predetermined meeting location and/or the location of group leader 52A. If such a request is desired, then in step P5, coordination system 40 can provide such a request to the client device 16 of the user 52B. Alternatively, in step P4, group leader 52A could request that all users 52A-B in the group return to a predetermined location and/or the location of group leader 52A. In this case, in step P5, coordination system 40 can provide the request to all client devices 16.

As discussed above, each client device 16 can include a client location system 42 that enables client device 16 to communicate with base device 14 and/or provide any required information for use by the corresponding user 52B. To this extent, client location system 42 is shown including a location system 32B for obtaining location information 50 for the particular client device 16 as discussed above. In addition, location system 32B can provide the location information 50 for processing by base device 14. Still further, location system 32B can request location information 50 for base device 14. In particular, user 52B could use an interface generated by location system 32B to request the current location of group leader 52A (and base device 14). In this case, location system 32A on base device 14 can obtain location information 50 for base device 14 and provide a response to the request that includes the location information 50 for processing by location information 32B, such as display to user 52B. Further, location system 32B can monitor the location of user 52B with respect to the defined area 70 (FIG. 2). In this case, should user 52B leave the defined area 70, location system 32B could generate an alarm for user 52B.

Client location system 42 can further include a response system 44, which provides a response to any request/query received from base device 14 that requires the attention of user 52B. For example, group leader 52A could request that user 52B return to a rendezvous location. In this case, response system 44 can generate an interface that enables user 52B to inform group leader 52A of his/her status in returning (e.g., now returning, require five minutes, etc.). Coordination system 40 can provide (e.g., display, play, or the like) this response information for use by group leader 52A. Similarly, when user 52B is outside of the defined area 70 (FIG. 2), coordination system 40 could generate an inquiry to determine why user 52B has left the defined area 70. In this case, response system 44 can enable user 52B to generate an explanation and/or status regarding his/her departure from the defined area 70, which can be provided for use by group leader 52A.

Additionally, client location system 42 can comprise a panic system 46 that enables user 52B to generate a request for help or the like. For example, user 52B could become lost and require assistance to return to a rendezvous location, become injured and unable to change location, or the like. In this case, user 52B can generate a help request using panic system 46, which can provide the help request for processing by base device 14. Coordination system 40 can receive the help request, and based on the type of help requested, group leader 52A can use coordination system 40 to provide a response that includes the requested help for use by user 52B, move to the location of user 52B, and/or request assistance from one or more additional individuals in the group to assist user 52B.

It is understood that the various features of the invention described herein are only illustrative and various additional features can be included. For example, session system 34 can define one or more subsets of users 52A-B within the group of individuals. Additionally, a subset leader could be designated for each of the subsets of users 52A-B. In this case, group leader 52A could communicate with one or more of the subsets individually, either as a group and/or via the subset leader. Further, the device for each subset leader could comprise a base location system 30 that would enable the subset leader to manage the users 52A-B within the subset in the same manner as the group leader 52A.

While shown and described herein as a method and system for managing location information for a group of users, it is understood that the invention further provides various alternative embodiments. For example, in one embodiment, the invention provides a computer-readable medium that includes computer program code to enable a computer infrastructure to manage location information for a group of users. To this extent, the computer-readable medium includes program code, such as base location system 30 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to manage location information for a group of users as described above. In this case, the service provider can create, maintain, support, etc., a computer infrastructure, such as computer infrastructure 12 (FIG. 1), that performs the process steps of the invention for one or more customers and provides the necessary information to base device 14 (FIG. 1). In return, the service provider can receive payment from the customer (s) under a subscription and/or fee agreement and/or the service provider can receive payment from the sale of advertising space to one or more third parties.

In still another embodiment, the invention provides a method of generating a system for managing location information for a group of users. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as base device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing location information for a group of users, the method comprising:

identifying a set of client devices on a base device, wherein each client device is used by one of the group of users, wherein a user in the group of users is an exempted user, and wherein the base device is used by one of the group of users designated as a group leader;

defining an area for the group of users on the base device, wherein the area is defined as a maximum radius from the group leader, and wherein each user in the group of users is to remain within the area;

receiving an override of the defined area for the exempted user in the group of users on the base device, wherein the exempted user is allowed to leave the area without generating an alarm in response to the override and wherein the exempted user is not the group leader;

obtaining location information for each client device in the set of client devices on the base device, the location information including location information for the client device used by the exempted user; and processing the location information on the base device for use by the group leader, wherein the processing includes:

displaying location information for each of the client devices on the base device without regard to whether a client device is outside the area;

determining whether a client device in the set of client devices is outside the area; and generating an alarm on the base device in response to one of the client devices that is not used by the exempted user being outside the area.

2. The method of claim 1, further comprising initializing a tracking session for the set of client devices and the base device.

3. The method of claim 1, wherein the obtaining location information step includes:

requesting location information for at least one of the set of client devices; and receiving location information from the at least one of the set of client devices.

4. The method of claim 3, wherein the obtaining location information step further includes defining an update period, wherein the requesting and receiving steps are periodically performed for each of the set of client devices based on the update period.

5. The method of claim 1, further comprising:
requesting location information for the base device from a location identification system;
receiving the location information for the base device from the location identification system; and
providing the location information for the base device for processing by at least one of the set of client devices.

6. The method of claim 1, further comprising providing a request to one of the set of client devices for the corresponding user to move to a location of the group leader.

7. The method of claim 1, further comprising receiving a help request from one of the client devices.

8. A computer-readable medium for enabling a computer infrastructure to manage location information for a group of users, the computer-readable medium comprising computer program code for performing the method steps of claim 1.

9. A method of managing location information for a group of users on a base device used by one of the group of users designated as a group leader, the method comprising:
identifying a set of client devices on the base device, wherein each client device is used by one of the group of users, and wherein a user in the group of users is an exempted user;
defining an area for the group of users on the base device, wherein the area is defined as a maximum radius from the group leader and wherein each user in the group of users is to remain within the area;
receiving an override of the defined area for the exempted user in the group of users on the base device, wherein the exempted user is allowed to leave the area without generating an alarm in response to the override and wherein the exempted user is not the group leader;
defining an update period on the base device;
periodically obtaining location information for each client device in the set of client devices on the base device based on the update period, the location information including location information for the client device used by the exempted user;
determining whether one of the client devices is outside the area on the base device based on the location information for the one of the client devices; and
generating an alarm on the base device in response to one of the client devices that is not used by the exempted user being outside the area.

10. The method of claim 9, further comprising periodically obtaining location information for the base device, wherein the determining step is further based on the location information for the base device.

11. A system for managing location information for a group of users, the system comprising:
a base device used by one of the group of users designated as a group leader, the base device including:
means for identifying a set of client devices, wherein each client device is used by one of the group of users, and wherein a user in the group of users is an exempted user;
means for defining an area for the group of users, wherein the area is defined as a maximum radius from the group leader, and wherein each user in the group of users is to remain within the area;
means for receiving an override of the defined area for the exempted user in the group of users, wherein the exempted user is allowed to leave the area without generating an alarm in response to the override and wherein the exempted user is not the group leader;
means for obtaining location information for each client device in the set of client devices, the location information including location information for the client device used by the exempted user; and
means for processing the location information, wherein the means for processing includes:
means for displaying location information for each of the client devices on the base device without regard to whether a client device is outside the area;
means for determining whether a client device in the set of client devices is outside the area; and
means for generating an alarm on the base device in response to one of the client devices that is not used by the exempted user being outside the area.

12. The system of claim 11, wherein the base device further includes:
means for requesting location information from a location identification system;
means for receiving the location information from the location identification system; and
means for providing the location information for processing by at least one of the set of client devices.

13. The system of claim 11, further comprising at least one client device including:
means for requesting location information from a location identification system;
means for receiving the location information from the location identification system; and
means for providing the location information for processing by the base device.

14. The system of claim 13, wherein the at least one client device further includes:
means for generating a help request; and
means for providing the help request for processing by the base device.

15. The method of claim 1, farther comprising:
receiving a request for location information for any one of the set of client devices on the base device; and
displaying the location information for the one of the set of client devices on the base device in response to the request.

16. The method of claim 2, wherein the initializing includes generating a unique session identifier for the tracking session, wherein communications between the base device and the set of client devices for the tracking session include the unique session identifier.

17. The method of claim 2, wherein the initializing includes defining a subset of users within the group of users, wherein the subset of users includes a subset leader and at least one other user from the group of users, and wherein the subset leader uses a subset leader device that enables the subset leader to manage location information for each user in the subset of users.

* * * * *

UNITED STATES PATENT AND TRADEMARK OFFICE
CERTIFICATE OF CORRECTION

PATENT NO.       : 7,660,872 B2                                           Page 1 of 1
APPLICATION NO.  : 10/908565
DATED            : February 9, 2010
INVENTOR(S)      : Delia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this

Thirtieth Day of November, 2010

David J. Kappos
*Director of the United States Patent and Trademark Office*